US012578252B2

(12) United States Patent
Dollinger et al.

(10) Patent No.: US 12,578,252 B2
(45) Date of Patent: Mar. 17, 2026

(54) REVOLVING DRUM ARRANGEMENT FOR A TIRE TEST BENCH, TIRE TEST BENCH AND METHOD FOR TESTING VEHICLE TIRES

(71) Applicant: ZF Friedrichshafen AG, Friedrichshafen (DE)

(72) Inventors: Thomas Dollinger, Passau (DE); Andreas Griebl, Haarbach (DE); Florian Stemplinger, Wegscheid (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 120 days.

(21) Appl. No.: 18/006,753

(22) PCT Filed: Jul. 26, 2021

(86) PCT No.: PCT/EP2021/070860
§ 371 (c)(1),
(2) Date: Jan. 25, 2023

(87) PCT Pub. No.: WO2022/023269
PCT Pub. Date: Feb. 3, 2022

(65) Prior Publication Data
US 2023/0273096 A1 Aug. 31, 2023

(30) Foreign Application Priority Data
Jul. 29, 2020 (DE) ..................... 10 2020 209 547.7

(51) Int. Cl.
G01M 17/02 (2006.01)

(52) U.S. Cl.
CPC ................................ G01M 17/022 (2013.01)

(58) Field of Classification Search
CPC ........... G01M 17/022; G01M 17/0074; G01M 17/065; G01M 17/021; G01L 5/20
See application file for complete search history.

(56) References Cited

U.S. PATENT DOCUMENTS

| | | | |
|---|---|---|---|
| 5,703,284 A | 12/1997 | Gerhards et al. | |
| 7,197,920 B2 | 4/2007 | Friske et al. | |
| (Continued) | | | |

FOREIGN PATENT DOCUMENTS

| | | |
|---|---|---|
| DE | 28 31 978 | 2/1980 |
| DE | 299 23 728 U1 | 8/2001 |
| (Continued) | | |

OTHER PUBLICATIONS

Machine Translation of DE 2831978 A1 (Year: 1980).*

(Continued)

*Primary Examiner* — Stephen D Meier
*Assistant Examiner* — Quang X Nguyen
(74) *Attorney, Agent, or Firm* — Finch & Maloney PLLC

(57) ABSTRACT

A revolving drum arrangement (2) for a tire testing rig (1) has a drum body (5) and a friction wheel drive (6), wherein on its outer circumference (9) the drum body (5) has a running surface (9) for making contact with a vehicle tire (4) and is arranged to rotate about its running axle. The friction wheel drive (6) is designed to drive the drum body (5) when it is in contact with the drum body (5). The revolving drum arrangement (2) according to the invention is distinguished in that the friction wheel drive (6) is arranged on a friction wheel carriage (10) that is designed to move the friction wheel drive (6) along an infeed direction so that the friction wheel drive (6) can be brought into contact with the drum body (5). A corresponding tire testing rig (1) and method are also disclosed.

19 Claims, 1 Drawing Sheet

(56)　　　　　References Cited

U.S. PATENT DOCUMENTS

| | | | |
|---|---|---|---|
| 2006/0169034 A1 | 8/2006 | Ouyang | |
| 2017/0146431 A1* | 5/2017 | Nevin | G01L 3/24 |
| 2019/0204185 A1* | 7/2019 | Bösl | G01M 17/022 |

FOREIGN PATENT DOCUMENTS

| | | | | |
|---|---|---|---|---|
| JP | 2010091365 A | * | 4/2010 | G01M 1/16 |
| WO | 2015/118657 A1 | | 8/2015 | |
| WO | 2019/068425 A2 | | 4/2019 | |

OTHER PUBLICATIONS

European Patent Office, International Search Report issued in International patent application PCT/EP2021/070860 (Nov. 2, 2021).
European Patent Office, Written Opinion issued in International patent application PCT/EP2021/070860 (Nov. 2, 2021).
German Patent Office, German Search Report issued in German patent application 10 2020 209 547.7 (Apr. 6, 2021).

* cited by examiner

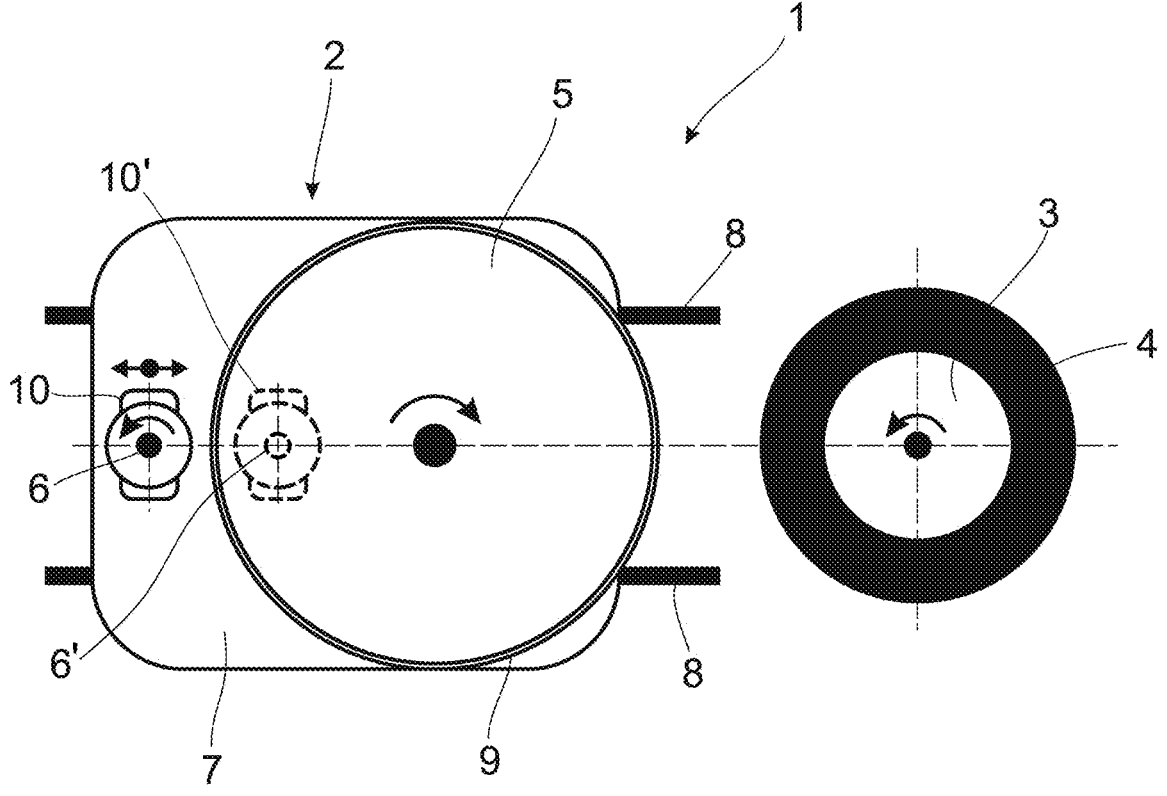

REVOLVING DRUM ARRANGEMENT FOR A TIRE TEST BENCH, TIRE TEST BENCH AND METHOD FOR TESTING VEHICLE TIRES

RELATED APPLICATIONS

This application claims the benefit under 35 U.S.C. § 371 as a U.S. National Phase Application of application no. PCT/EP2021/070860, filed on 26 Jul. 2021, which claims benefit of German Patent Application no. 10 2020 209 547.7 filed 29 Jul. 2020, the contents of which are hereby incorporated herein by reference in their entireties.

FIELD OF THE DISCLOSURE

The present invention relates to a revolving drum arrangement, a tire testing stand, and a method for testing vehicle tires.

BACKGROUND

From the prior art tire testing stands are known, by means of which vehicle tires can be subjected to numerous different testing processes. Known design forms of tire testing stands are, for example, so-termed half-axle testing stands, tire characteristic testing stands, and rolling resistance testing stands. In many different testing methods for vehicle tires forces are simulated, such as those occurring during actual driving operation between the vehicle tires and the road. During this, as a stand-in for the road, a revolving drum is usually used.

In a so-termed balance testing process, for example, the test is carried out without contact with a revolving drum, whereas in contrast, in a so-termed uniformity testing process, the test is carried out with contact between the tire and a revolving drum. Both testing methods can be combined in a single tire testing stand in one testing cycle. For that, for the uniformity test procedure the non-driven rotating drum is accelerated from rest against the tire acting as a friction wheel. Then, after the test the rotating drum coasts down to rest.

In the known tire testing stands, to avoid tire abrasion or tire wear and the resulting pollution, it is usual to bring the vehicle tires to be tested and the rotating drum into contact only when their rotation speeds are identical.

In this connection DE 10 2006 011 703 A1 describes a testing device for a vehicle wheel with a wheel test spindle which supports the wheel, and a tire fitted onto the wheel while they rotate. A road simulation drum with an outer surface is in contact with the tire during the test.

DE 299 23 728 U1 describes a revolving drum for a vehicle-testing or tire-testing stand, wherein a segment of the running surface can be removed and an obstacle with negative radial elevation can be used. A flat-machined carrier plate is welded into the outer surface of the cylindrical revolving drum, onto which various obstacles and the removable original running surface section can be screwed.

From DE 10 2017 217 816 A1 a revolving drum arrangement with a drum body for a testing stand is known. The drum body is arranged on a base frame and can be driven by a friction wheel drive.

SUMMARY

However, the known tire testing stands share the disadvantage that revolving drums of the known tire testing stands are as a rule not driven and yet, owing to their diameter typically of more than one meter and their metallic structure, they have a comparatively large moment of inertia. Since after each test run the revolving drums coast to a stop, correspondingly long waiting times are needed in order to reach a synchronization of the running speed of the revolving drum with the vehicle tire to be tested. But such tedious synchronization processes influence the cycle time of the tire testing stand unfavorably. Yet, if a drive for accelerating or braking the revolving drum is provided, then during a test cycle this has an adverse effect on the rolling behavior of the revolving drum and thus also on the rolling behavior of the vehicle tire to be tested.

A purpose of the present invention is to propose an improved revolving drum arrangement for a tire testing stand.

According to the invention, this objective is achieved by the revolving drum arrangement for a tire testing stand according to claim 1. Advantageous design features and further developments of the invention emerge from the dependent claims.

The invention relates to a revolving drum arrangement for a tire testing stand having a drum body and a friction wheel drive, wherein on its outer circumference the drum body has a running surface for making contact with a vehicle tire and is arranged to rotate about its running axle, and wherein the friction wheel drive is designed to drive the drum body when it is in contact with the drum body. The revolving drum arrangement according to the invention is distinguished in that the friction wheel drive is arranged on a friction wheel carriage, such that the friction wheel carriage is designed to move the friction wheel drive along an infeed direction so that the friction wheel drive can be brought into contact with the drum body.

Thus, a revolving drum arrangement is provided which is suitable for use in a tire testing stand. The revolving drum arrangement serves in particular for road simulations for a vehicle tire.

For that purpose, the revolving drum arrangement comprises a drum body, which in the course of road simulations represents the running surface for the vehicle tire. Preferably, the drum body has a cylindrical shape and its outer surface is designed as the running surface for the vehicle tires. Advantageously, the running surface is formed by the cylindrical outer envelope surface of the drum body.

The drum body is arranged in the revolving drum arrangement in such manner that it can rotate about its running axle. Advantageously, the revolving drum arrangement comprises for example a base frame on which the drum body is arranged so that it can rotate. The running axle of the cylindrical drum body is preferably identical with its longitudinal axis.

Furthermore, the revolving drum arrangement comprises a friction wheel drive which can drive the drum body and in particular also can brake the drum body. For that purpose, the friction wheel drive has a friction wheel which allows a frictional or force-locking connection to the drum body when it is in contact with the drum body, in particular in contact with the running surface of the drum body.

According to the invention, it is now provided that the friction wheel drive is arranged on a friction wheel carriage which is part of the revolving drum arrangement, this friction wheel carriage being designed to move the friction wheel drive along an infeed direction so that the friction wheel drive can be bought into contact with the drum body. For that purpose, the friction wheel carriage, for example, can be arranged on rails provided for the purpose.

This advantageously enables the friction wheel drive to be brought into contact with the drum body as necessary, in particular into contact with the running surface. Likewise, the friction wheel drive can be withdrawn again from the drum body or its running surface when no further drive torque or braking torque on the drum body is required.

In a typical tire testing cycle, various speed intervals are driven through and thereby the rolling behavior of the vehicle tire to be tested is investigated. To be able more rapidly to reach the necessary synchronization of the running speed of the revolving drum with that of the tire being tested when, for example, the tire to be tested is changed, it is advantageous to adjust the speed of the drum body by means of the friction wheel drive while the next tire to be tested is being fitted and prepared for the testing process.

During the actual testing process the friction wheel drive can then be withdrawn again from the drum body, so that the rolling behavior of the vehicle tire is not indirectly influenced by the friction wheel drive.

In that way qualitatively high-grade test data can be obtained in comparatively short cycle times.

In the context of the invention the term "running speed" is understood to be that translational speed which a cylindrical body such as the drum body or the vehicle tire would have if it were actually rolling over a subsurface at the rotation speed set in each case. Since as a rule the revolving drum has a substantially larger diameter than the vehicle tire, at correspondingly lower rotation speeds it already reaches the same running speed as a vehicle tire rolling against it.

According to a preferred embodiment of the invention it is provided that the friction wheel drive can be brought into contact with the outer circumference of the running surface or into contact with an inner circumference of the running surface. Depending on whether the friction wheel drive can be brought into contact with the outer circumference or the inner circumference of the running surface, the friction wheel drive with the friction wheel carriage is advantageously arranged outside or inside the drum body. An arrangement outside the drum body offers the advantage of comparatively good accessibility and simple assembly, whereas an arrangement inside the drum body makes for a comparatively space-saving and compact structure of the revolving drum arrangement.

According to a further preferred embodiment of the invention it is provided that the friction wheel drive comprises a friction wheel motor, the said motor being designed to set and adjust a rotation speed of the friction wheel drive. The friction wheel motor is preferably an electric motor and drives the friction wheel directly, or indirectly by way of a gear ratio step.

Preferably, it is provided that the friction wheel drive also comprises a brake that can reduce the rotation speed of the friction wheel drive. The brake can be, for example, a mechanical friction brake, or a no-contact eddy-current brake.

According to a further preferred embodiment of the invention, it is provided that the friction wheel drive is designed to set or adjust a rotation speed of the drum body about its running axle. This means that the friction wheel drive, particularly in relation to its mechanical performance, i.e. torque and rotation speed, but also in relation to its ability to form a driving connection to the drum body, is suitable for setting the rotation speed of the drum body about its running axle. Thus, by means of the friction wheel drive the drum body can be adjusted to the desired rotation speed in a simple manner. The electric motor in this case enables the rotation speed of the drum body not only to be increased, but also to be reduced.

In a further preferred embodiment of the invention, it is provided that the drum body is made of metal. This makes for great durability and only little wear, in particular of the running surface of the drum body, even when used continually and under high loads. However, by virtue of its metallic structure the drum body has a comparatively high moment of inertia, which in turn would result in comparatively tedious acceleration and braking processes were it not, in particular, for the friction wheel drive provided in accordance with the invention.

According to a further preferred embodiment of the invention, it is provided that the outer circumference has a diameter of at least 1.5 m and the running surface a width of at least 0.5 m. Thus, the revolving drum arrangement is particularly suitable for a tire testing stand for testing utility vehicle tires.

The invention also relates to a tire testing stand for testing vehicle tires. The tire testing stand according to the invention is distinguished in that the tire testing stand comprises a revolving drum arrangement according to the invention. Thus, the advantages already mentioned in connection with the revolving drum arrangement according to the invention also apply to the tire testing stand according to the invention.

According to a preferred embodiment of the invention, it is provided that the tire testing stand also comprises a wheel spindle for holding a vehicle tire. In that way, a vehicle tire to be tested can be fitted, tested and set aside again while maintaining comparatively short cycle times.

In the context of the invention the vehicle tire itself is not part of the tire testing stand.

According to a further preferred embodiment of the invention, it is provided that the tire testing stand also comprises a drum carriage such that the revolving drum arrangement is arranged on the drum carriage and the drum carriage is designed to bring a running surface of the revolving drum arrangement into contact with the vehicle tire. This has the advantage that by means of the drum carriage the revolving drum arrangement can be moved toward the vehicle tire which is fitted on the tire spindle and is to be tested, and the running surface of the revolving drum can be brought into contact with the vehicle tire. Likewise, at the end of the testing process the revolving drum arrangement can be withdrawn again from the vehicle tire by means of the drum carriage. Thus, a desired rotation speed of the revolving drum can be set before the revolving drum comes into contact with the vehicle tire.

In a further preferred embodiment of the invention, it is provided that the tire testing stand also comprises a spindle motor, which is designed to set a rotation speed of the wheel spindle. Thus, for example, during the testing process an acceleration behavior and a deceleration behavior of the vehicle tire can be tested. The spindle motor is preferably an electric motor.

According to a further preferred embodiment of the invention, it is provided that the tire testing stand comprises synchronization means, the synchronization means being designed to synchronize a running speed of the vehicle tire and a running speed of the drum body of the revolving drum arrangement. Thus, the synchronization means match the running speed of the drum body and the running speed of the vehicle tire so that they are identical and the revolving drum with its running path can be brought into contact with the vehicle tire in order to carry out a testing process.

The synchronization means preferably comprise rotation speed measurement means for the tire spindle, for the revolving drum and in particular also for friction wheel drive. In addition, the synchronization means advantageously comprise calculation means for calculating a running speed of the revolving drum and the vehicle tire, with reference to the rotation speeds measured.

In a further preferred embodiment of the invention it is provided that an infeed axis of the drum carriage is parallel to an infeed axis of a friction wheel carriage of the revolving drum arrangement.

Finally, the invention also relates to a method for testing vehicle tires using a tire testing stand according to the invention, the said method comprising the following steps:

fitting of the vehicle tire onto a wheel spindle,
  accelerating the rotation speed of the vehicle tire on the
    wheel spindle,
  accelerating the rotation speed of a drum body by means
    of a friction wheel drive which is in contact with the
    drum body, until a running speed of the drum body is
    synchronized with a running speed of the vehicle tire,
  bringing into contact a running surface of the drum body
    with the vehicle tire by means of a drum carriage, and
  carrying out a vehicle tire test.

The distinguishing feature of the method according to the invention is that the friction wheel drive is withdrawn from the drum body by a friction wheel carriage before the vehicle tire test is carried out. Thus, the method according to the invention enables a vehicle tire test to be carried out on a tire testing stand according to the invention, making full use of the advantages already described.

In the context of the invention, "accelerating the rotation speed of the vehicle tire" and "accelerating the rotation speed of the drum body" should be understood to mean not only a positive acceleration in the sense of a rotation speed increase, but also a negative acceleration in the sense of a rotation speed reduction.

BRIEF DESCRIPTION OF THE DRAWING

Below, an example of the invention is explained with reference to embodiments illustrated in the FIGURES, which show:

FIG. 1: As an example, and represented schematically, a possible embodiment of a tire testing stand according to the invention.

The same objects, functional units and comparable components are denoted by the same indexes in all the figures. These objects, functional units and comparable components are of identical design as regards their technical features, unless explicitly stated otherwise in the description or implied therein.

DETAILED DESCRIPTION

FIG. 1 shows, as an example and represented schematically a possible embodiment of a tire testing stand 1 according to the invention, such that the tire testing stand 1 comprises a revolving drum arrangement 2 and a wheel spindle 3.

On the wheel spindle 3 is arranged, for example, a vehicle tire 4, in this case a utility vehicle tire 4. The vehicle tire 4 is not part of the testing stand 3 and serves in FIG. 1 only to clarify the function of the testing stand 1. The wheel spindle 3 comprises a spindle motor (not shown in FIG. 1) which can set the wheel spindle 3 and therefore the vehicle tire 4 arranged on the wheel spindle 3 into motion, rotating about its rotation axle.

The revolving drum arrangement 2 comprises a drum body 5 and a friction wheel drive 6, these being arranged on a drum carriage 7 of the revolving drum arrangement 2. On its outer circumference 9 the drum body 5 has a running surface 9 for making contact with the vehicle tire 4 and is arranged to rotate about its running axle.

The drum carriage 7 can be moved along rails 8 so that it can bring the drum body 5 into contact with the vehicle tire 4.

The friction wheel drive 6, 6' can be driven by a friction wheel electric motor (not shown in FIG. 1), which is designed to set and adjust a rotation speed of the friction wheel drive 6, 6' The friction wheel drive 6, 6' is arranged outside or inside the drum body 5 on a friction wheel carriage 10 10', which for its part is arranged on the drum carriage 7. The friction wheel carriage 10, 10' enables the friction wheel drive 6, 6' to be brought into contact with the outer circumference or the inner circumference of the running surface 9 of the drum body 5 and thus to form a frictional connection. In that way a torque, in the sense of an increase or also a reduction of the rotation speed, can be transmitted from the friction wheel drive 6, 6' to the drum body 5 with the running speed of the vehicle tire. During a testing process the friction wheel drive 6, 6' can then be drawn back again by the friction wheel carriage 10, 10' from the drum body, in order not to influence the test results of the vehicle tire 4. As can be seen, an infeed axis of the drum carriage 7 is parallel to an infeed axis of a friction wheel carriage 10, 10' of the revolving drum arrangement 2.

As an example, the tire testing stand 1 is a testing stand 1 for utility vehicle tires with a drum body 5 made of metal. For example, the drum body 5 has a diameter of 1.6 m and the running surface 9 has a width of 0.6 m.

INDEXES

1 Tire testing stand
2 Revolving drum arrangement
3 Wheel spindle
4 Vehicle tire, utility vehicle tire
5 Drum body
6 Friction wheel drive
7 Drum carriage
8 Rails
9 Outer circumference, running surface
10 Friction wheel carriage

The invention claimed is:

1. A revolving drum arrangement for a tire testing rig, comprising:

a drum body movably mounted on rails of a drum
    carriage, the drum body having an inner circumference
    and an outer circumference with a running surface
    configured to contact a vehicle tire, wherein the drum
    body is arranged to rotate about a running axle and is
    movable along the drum carriage; and
  a friction wheel carriage; and
  a friction wheel drive, arranged on the friction wheel
    carriage and configured to drive the drum body when
    the friction wheel drive is in contact with the running
    surface of the drum body,
  wherein the friction wheel carriage is configured to move
    the friction wheel drive along an infeed direction so
    that the friction wheel drive can be brought into contact
    with the drum body; and wherein the friction wheel drive can be brought into contact with the inner circumference or with the outer circumference of the running surface.

2. The revolving drum arrangement according to claim 1, wherein the friction wheel drive comprises a friction wheel motor configured to set and adjust a rotation speed of the friction wheel drive.

3. The revolving drum arrangement according to claim 1, wherein the friction wheel drive is configured to set and adjust a rotation speed of the drum body about the running axle.

4. The revolving drum arrangement according to claim 1, wherein the drum body is made of metal.

5. The revolving drum arrangement according to claim 1, wherein the outer circumference has a diameter of at least 1.5 m and the running surface has a width of at least 0.5 m.

6. A tire testing rig for testing vehicle tires, the tire testing rig comprising the revolving drum arrangement according to claim 1.

7. The tire testing rig according to claim 6, wherein the drum carriage has an infeed axis oriented parallel to an infeed axis of a friction wheel carriage of the revolving drum arrangement.

8. The tire testing rig according to claim 1, further comprising a wheel spindle configured for holding a vehicle tire.

9. The tire testing rig according to claim 1, further comprising a spindle motor, the spindle motor configured to set and adjust a rotation speed of a wheel spindle.

10. The tire testing rig according to claim 9, further comprising synchronization means configured to synchronize a running speed of the vehicle tire and a running speed of a drum body of the revolving drum arrangement.

11. A method for testing vehicle tires in a tire testing rig, comprising the following steps:

providing a tire testing rig according to claim 1;

mounting the vehicle tire on a wheel spindle;

accelerating a rotation speed of the vehicle tire on the wheel spindle;

accelerating a rotation speed of a drum body by means of a friction wheel drive that is in contact with the drum body, until a running speed of the drum body is synchronized with a running speed of the vehicle tire;

bringing a running surface of the drum body into contact with the vehicle tire by moving the drum body along the drum carriage; and carrying out a vehicle tire test, wherein the friction wheel drive is withdrawn from the drum body by means of a friction wheel carriage before the vehicle tire test is carried out.

12. A revolving drum arrangement for a tire testing rig, comprising:

a drum carriage with rails;

a drum body having an inner circumference and an outer circumference with a running surface configured to contact a vehicle tire, the drum body arranged to rotate about a running axle and being movable along the rails of the drum carriage;

a friction wheel carriage; and a friction wheel drive arranged on the friction wheel carriage and configured to drive the drum body when the friction wheel drive is in contact with the drum body;

wherein the friction wheel carriage is configured to move the friction wheel drive along an infeed direction so that the friction wheel drive can be brought into contact with the inner circumference of the running surface; and wherein the drum body can move along the rails to be brought into contact with a tire to be tested.

13. The revolving drum arrangement according to claim 12, wherein the friction wheel drive comprises a friction wheel motor configured to set and adjust a rotation speed of the friction wheel drive.

14. The revolving drum arrangement according to claim 12, wherein the friction wheel drive is configured to set and adjust a rotation speed of the drum body about the running axle.

15. The revolving drum arrangement according to claim 12, wherein the drum body is made of metal.

16. The revolving drum arrangement according to claim 12, wherein the outer circumference has a diameter of at least 1.5 m and the running surface has a width of at least 0.5 m.

17. A tire testing rig for testing vehicle tires, the tire testing rig comprising:

the revolving drum arrangement according to claim 2; and a wheel spindle configured for holding a vehicle tire;

wherein the revolving drum arrangement is arranged on the drum carriage and wherein the drum carriage is configured to move along the rails of the drum carriage to bring a running surface of the revolving drum arrangement into contact with the vehicle tire on the wheel spindle.

18. The tire testing rig according to claim 17, further comprising synchronization means, configured to synchronize a running speed of the vehicle tire and a running speed of the drum body of the revolving drum arrangement.

19. The tire testing rig according to claim 17, wherein the drum carriage has an infeed axis oriented parallel to an infeed axis of the friction wheel carriage of the revolving drum arrangement.

* * * * *